United States Patent
Bouchez et al.

(10) Patent No.: US 10,759,713 B2
(45) Date of Patent: Sep. 1, 2020

(54) METHOD FOR PRODUCING A DOUBLE-WALLED THERMOSTRUCTURAL MONOLITHIC COMPOSITE PART, AND PART PRODUCED

(71) Applicants: MBDA France, Le Plessis-Robinson (FR); Airbus Defence and Space GmbH, Ottobrunn (DE)

(72) Inventors: Marc Bouchez, Bourges (FR); Steffen Beyer, Munich (DE); Stephan Schmidt-Wimmer, Dachau (DE)

(73) Assignees: MBDA FRANCE, Le Plessis-Robinson (FR); AIRBUS DEFENCE AND SPACE GMBH, Ottobrunn (DE)

( * ) Notice: Subject to any disclaimer, the term of this patent is extended or adjusted under 35 U.S.C. 154(b) by 350 days.

(21) Appl. No.: 15/514,900

(22) PCT Filed: Sep. 24, 2015

(86) PCT No.: PCT/FR2015/000189
§ 371 (c)(1),
(2) Date: Mar. 28, 2017

(87) PCT Pub. No.: WO2016/051031
PCT Pub. Date: Apr. 7, 2016

(65) Prior Publication Data
US 2017/0217843 A1   Aug. 3, 2017

(30) Foreign Application Priority Data
Oct. 2, 2014   (FR) ..................................... 14 02221

(51) Int. Cl.
*B29C 70/24*   (2006.01)
*B29C 65/02*   (2006.01)
(Continued)

(52) U.S. Cl.
CPC ............ *C04B 35/806* (2013.01); *B29C 65/62* (2013.01); *B29C 66/729* (2013.01);
(Continued)

(58) Field of Classification Search
CPC ....... B29C 70/24; B29C 70/543; B29C 70/40; B29C 70/483; B29C 65/00; B29C 65/02;
(Continued)

(56) References Cited

U.S. PATENT DOCUMENTS 5,160,471 A * 11/1992 Vives ...................... C04B 35/80
                                                              156/242
5,360,500 A * 11/1994 Evans .................. B29D 24/008
                                                              156/74

(Continued)

FOREIGN PATENT DOCUMENTS

EP    1342552 A1    9/2003
FR    2988777 A1    10/2013

*Primary Examiner* — Philip C Tucker
*Assistant Examiner* — Brian R Slawski
(74) *Attorney, Agent, or Firm* — Browdy and Neimark, P.L.L.C.

(57) ABSTRACT

A fibrous preform (1) is produced, provided with a sandwich structure comprising an intermediate flexible core (4) and two outer fibrous frames (2, 3), respectively arranged on opposing outer faces of said flexible core (4) and assembled by sections of wire (8, 9) passing through said fibrous frames (2, 3), said preform (1) being impregnated with resin. Said preform is then hardened and the core (4) is removed, preferably by pre-densification with chemical vapour infiltration, and the structure produced is then densified with liquid-phase infiltration.

8 Claims, 1 Drawing Sheet

(51) Int. Cl.
*B29C 65/52* (2006.01)
*B29C 65/62* (2006.01)
*B29C 65/72* (2006.01)
*B29C 65/48* (2006.01)
*B29C 65/00* (2006.01)
*B32B 5/26* (2006.01)
*B32B 5/06* (2006.01)
*B32B 7/09* (2019.01)
*B32B 18/00* (2006.01)
*B32B 37/00* (2006.01)
*C04B 35/80* (2006.01)
*C04B 35/573* (2006.01)
*B29C 70/68* (2006.01)
*B29C 70/44* (2006.01)
*B29L 9/00* (2006.01)

(52) U.S. Cl.
CPC .......... *B29C 70/443* (2013.01); *B29C 70/68* (2013.01); *B32B 5/06* (2013.01); *B32B 5/26* (2013.01); *B32B 18/00* (2013.01); *C04B 35/573* (2013.01); *B29C 65/02* (2013.01); *B29C 65/483* (2013.01); *B29C 65/524* (2013.01); *B29C 65/72* (2013.01); *B29C 70/24* (2013.01); *B29L 2009/00* (2013.01); *B32B 7/09* (2019.01); *B32B 2250/03* (2013.01); *B32B 2250/20* (2013.01); *B32B 2260/021* (2013.01); *B32B 2260/023* (2013.01); *B32B 2260/04* (2013.01); *B32B 2260/046* (2013.01); *B32B 2307/306* (2013.01); *C04B 2235/428* (2013.01); *C04B 2235/5248* (2013.01); *C04B 2235/612* (2013.01); *C04B 2235/614* (2013.01); *C04B 2235/616* (2013.01); *C04B 2237/365* (2013.01); *C04B 2237/38* (2013.01); *C04B 2237/385* (2013.01); *C04B 2237/62* (2013.01); *D10B 2403/021* (2013.01)

(58) Field of Classification Search
CPC ....... B29C 65/10; B29C 65/528; B29C 65/54; B29C 65/524; B29C 65/62; B29C 65/72; B29C 66/00; B29C 66/43; B29C 66/438; B29C 66/729; B29C 70/086; B29C 70/22; B32B 5/06; B32B 5/26; B32B 7/08; B32B 7/09; B32B 2260/00; B32B 2260/021; B32B 2260/046; B32B 18/00; B32B 2307/306; B32B 5/02; B32B 5/024; B32B 5/18; Y10T 428/24033; Y10T 428/24174; Y10T 428/249923; Y10T 428/1393; Y10T 428/23914; C04B 35/806; C04B 35/83; D10B 2403/021; D10B 2505/02

USPC ... 156/60, 64, 65, 73.1, 89.11, 89.22, 89.25, 156/89.26, 90, 91, 92, 93, 153, 154, 155, 156/250, 252, 253, 278, 280, 292, 297, 156/298, 305, 307.1, 307.3, 307.5, 307.7, 156/314, 315, 329; 428/36.1, 36.9, 36.91, 428/102, 137, 138; 427/249.1, 249.2, 427/249.3, 249.4, 249.15, 249.16

See application file for complete search history.

(56) References Cited

U.S. PATENT DOCUMENTS

| | | | | |
|---|---|---|---|---|
| 5,415,715 | A * | 5/1995 | Delage | B32B 38/00 156/197 |
| 5,490,892 | A * | 2/1996 | Castagnos | B29C 37/0082 156/89.26 |
| 6,418,973 | B1 * | 7/2002 | Cox | B32B 5/26 139/383 R |
| 2002/0076541 | A1 * | 6/2002 | Jarmon | C04B 35/806 428/312.6 |
| 2004/0128946 | A1 * | 7/2004 | Salmon | B29C 70/24 52/782.1 |
| 2004/0134195 | A1 * | 7/2004 | Bouchez | F02K 7/10 60/767 |
| 2011/0121109 | A1 * | 5/2011 | Charleux | C04B 35/565 239/601 |
| 2011/0200748 | A1 * | 8/2011 | Eberling-Fux | C04B 35/571 427/249.2 |
| 2015/0083822 | A1 * | 3/2015 | Mecuson | F01D 25/162 239/265.11 |

* cited by examiner

METHOD FOR PRODUCING A DOUBLE-WALLED THERMOSTRUCTURAL MONOLITHIC COMPOSITE PART, AND PART PRODUCED

The present invention relates to a method for producing a thermostructural monolithic fibres/matrix composite part, comprising two skins of composite material which are spaced apart from one another and interconnected by a plurality of thread-like spacers of composite material, said part being able to withstand high internal and/or external pressures. The invention also relates to a monolithic part produced by carrying out a method of this kind.

FR-2 749 327 describes a monolithic composite part of this kind, intended for example for forming panels capable of conveying fluid, supports for space optics devices or refractory radomes for high-resolution radars, etc. Similarly, FR-2 718 670 refers to a double-walled monolithic composite part and thread-like spacers.

Furthermore, FR-2 836 690 discloses a method for producing a thermostructural monolithic part that does not involve any additional impregnation or curing operations and does not comprise pre-impregnating the stitching thread, but still makes it possible to precisely position the fibrous structure in the impregnation mould and to utilise in an optimum manner the mechanical properties of the fibres making up said skins. For this purpose, said method for producing a thermostructural monolithic fibres/matrix composite part, comprising two skins of composite material which are spaced apart from one another and interconnected by a plurality of thread-like spacers of composite material, is such that:

a) a flexible sandwich structure is formed that comprises an intermediate flexible core, which is made of a material that is capable of being penetrated by a needle and is impervious to the resin having to create said matrix, and two outer flexible fibrous frames arranged on opposed outer faces of said flexible core;

b) said fibrous frames and said core of said sandwich structure are joined by stitching by means of a thread forming stitches that include thread portions that pass through said fibrous frames and said core, said stitching thread consisting of a roving comprising a plurality of filaments that are not linked together, said thread portions that pass through said fibrous frames and said core having, following said stitching operation, longitudinal channels in said core that are provided between said filaments and extend from one of said fibrous frames to the other;

c) said sandwich structure is impregnated with resin in the viscous state, said impregnation operation being carried out such that said curable resin is made to penetrate said longitudinal channels of said thread through-portions in order to form, at the location of each of said portions, a resin bridge of which the opposed ends are in contact with the resin impregnating said flexible fibrous frames; and d) said resin impregnating said sandwich structure is then cured.

By means of this standard method, the thread through-portions are impregnated with resin when the fibrous frames of said skins are impregnated, and are cured when said fibrous frames are cured, prior to said core being removed, such that they become thread-like spacers of composite material and arranged between said composite skins.

The object of the invention is that of improving a method of this kind for producing a thermostructural monolithic fibres/matrix composite part, comprising two skins of composite material which are spaced apart from one another and interconnected by a plurality of thread-like spacers of composite material.

To this end, according to the invention, said method comprising at least:

A/ producing a fibrous preform provided with a sandwich structure comprising an intermediate flexible core and two outer fibrous frames arranged on opposed outer faces of said flexible core and joined by thread portions that pass through said fibrous frames, said preform being impregnated with resin;

B/ curing said preform and removing said core; and

C/ densifying the resulting structure, is characterised in that, in step C/, said structure is densified by liquid-phase infiltration.

This LSI liquid-phase infiltration (liquid silicon infiltration), which allows the silicon used to penetrate the centre of the preform, results in densification that is easy to control.

Moreover, this liquid-phase densification has other advantages, in particular in terms of cost and performance.

In a preferred embodiment, pre-densification is carried out in step B/ by CVI gas-phase infiltration (chemical vapour infiltration) so as to pre-densify said preform and thus said thread through-portions intended for forming said spacers so as to produce a carbon-carbon (C—C) material. R-CVI rapid infiltration (rapid chemical vapour infiltration) is preferably used; this type of infiltration is advantageous in terms of cost, implementation time and performance.

By means of this pre-densification, said thread through-portions are provided with a carbon layer, which makes it possible to protect said portions during the liquid-phase densification in step C/. Therefore, this preferred embodiment is based on the cooperation between the pre-densification and densification steps (for producing a C—C/SiC material), pre-densification making it possible to carry out densification without damaging the thread portions intended for forming the spacers, which contribute to making the monolithic composite part rigid, and densification having the aforementioned advantages.

Moreover, in this preferred embodiment, the preform that was pre-densified in step B/ is machined in an intermediate step between said steps B/ and C/. It is possible to machine the pre-densified preform (C—C) in the manner described below, but this machining would be very difficult to perform on the final material (C—C/SiC) following densification.

This intermediate step is preferably a step of low-thickness mechanical machining which is used to prepare the structure for liquid-phase densification and to give said structure its desired final geometry.

Moreover, threaded holes and/or bores are advantageously machined in said intermediate step. In this case, plugs are advantageously put in said threaded holes and said bores at least during the densification step, step C/, in order to prevent said holes and bores from getting clogged.

In a preferred embodiment, in order to achieve liquid-phase densification, in step C/, silicon is introduced in liquid paste form and spreads out under the effect of heat and pressure in a densification furnace.

Moreover, in step A/, a fibrous preform is advantageously produced that has variable thickness and is provided with stiffeners for example.

Furthermore, in a preferred embodiment, in step A/, the following operations are carried out as described in particular in FR-2 836 690:

a) a flexible sandwich structure is formed that comprises an intermediate flexible core, which is made of a material that is capable of being penetrated by a needle and is impervious to the resin having to create the matrix, and two outer flexible fibrous frames arranged on opposed outer faces of said flexible core;

b) said fibrous frames and said core of said sandwich structure are joined by stitching by means of a thread forming stitches that include thread portions that pass through said fibrous frames and said core, said stitching thread consisting of a roving comprising a plurality of filaments that are not linked together. Following this stitching operation, said thread portions that pass through said fibrous frames and said core have longitudinal channels in said core that are provided between said filaments and extend from one of said fibrous frames to the other; and c) said sandwich structure is impregnated with said resin, said impregnation operation being carried out such that said curable resin is made to penetrate said longitudinal channels of said thread through-portions in order to form, at the location of each of said portions, a resin bridge of which the opposed ends are in contact with the resin impregnating said fibrous frames.

The present invention also relates to a monolithic fibres/matrix composite part which comprises two skins of composite material which are spaced apart from one another and interconnected by a plurality of thread-like spacers of composite material, and is produced by carrying out the aforementioned method.

In a particular embodiment, at least one coating is applied on the outside of at least one of said skins (for example with the aim of making said skin impermeable).

The present invention can be used in particular in a number of fields that require a monolithic composite part of this kind that is capable of withstanding very high temperatures and/or very high internal and/or external pressures.

The figures of the accompanying drawings will give a clear understanding of how the invention can be implemented. In these drawings, identical reference numerals refer to similar elements.

The present invention relates to a method for producing a thermostructural monolithic fibres/matrix composite part 10, comprising two skins 11 and 12 of composite material which are spaced apart from one another and interconnected by a plurality of thread-like spacers 13 of composite material. A monolithic composite part 10 of this kind, which is intended for forming thermal protection means for example, and is shown in a partial and schematic view in FIG. 2, has to be able to withstand very high internal and/or external pressures.

Figure 1:
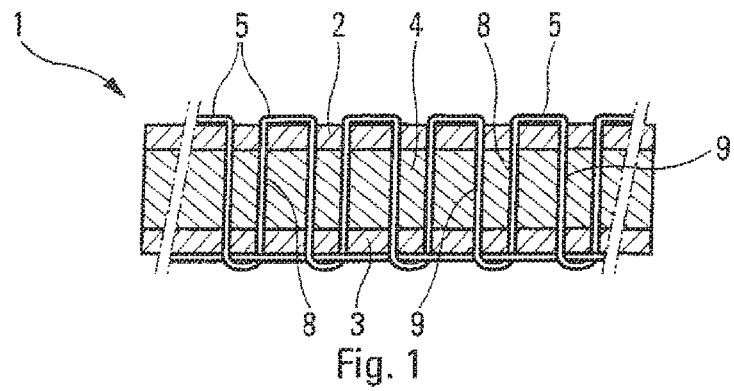
FIG. 1 is a schematic and partial view of a preform that is produced and used when carrying out the present invention.

Said production method comprises:

A/ forming, in the usual manner, a fibrous preform 1 provided with a sandwich structure comprising an intermediate flexible core 4 and two outer fibrous frames 2 and 3. Said fibrous frames 2 and 3 are arranged on opposed outer faces of said flexible core 4 and are joined by thread portions 8 and 9 that pass through said fibrous frames 2 and 3, as is shown in FIG. 1 and as described below, said preform 1 being impregnated with resin;

B/ curing said preform 1 and removing said core 4; and

C/ densifying the resulting structure.

According to the invention, the structure is densified by liquid-phase infiltration in step C/ such that a layer that is rich in SiC is applied.

LSI liquid-phase infiltration (liquid silicon infiltration, of this kind, as described below, which in particular allows the silicon used to penetrate the centre of the preform, results in densification that is easy to control.

Moreover, this liquid-phase densification has other advantages, in particular:
a reduced cost; and
improved performance.

In a preferred embodiment, pre-densification is carried out in step B/ by CVI gas-phase infiltration (chemical vapour infiltration) so as to pre-densify said preform 1 and thus said thread through-portions 8 and 9 (intended for forming said spacers 13). This pre-densification makes it possible to produce a carbon-carbon (C—C) structure. R-CVI rapid infiltration (rapid chemical vapour infiltration) is preferably used; this type of infiltration is advantageous in terms of cost, implementation time and performance.

By means of this pre-densification, said thread through-portions 8 and 9 are provided with a carbon layer, which makes it possible in particular to protect said portions during the liquid-phase densification carried out in step C/.

Therefore, this preferred embodiment is based on the cooperation between the pre-densification step (step B/) and the densification step (step C/) which makes it possible to create a C—C/SIC structure. Indeed, pre-densification makes it possible to carry out densification without damaging the thread portions 8 and 9 intended for forming the spacers 13 (which contribute to making the monolithic composite part 10 rigid), while densification has the aforementioned advantages and makes it possible to form a ceramic structure.

In a preferred embodiment, in order to carry out step A/, the following operations are carried out, as is described in particular in FR-2 836 690:

a) a flexible sandwich structure 1 is formed that comprises an intermediate flexible core 4, which is of a material that is both capable of being penetrated by a needle and impervious to the resin having to create said matrix. Said flexible sandwich structure 1 also comprises two outer flexible fibrous frames 2, 3 arranged on opposed outer faces of said flexible core 4;

b) said fibrous frames 2, 3 and said core 4 of said sandwich structure 1 are joined by stitching by means of a thread 5 forming stitches that include thread portions 8, 9 that pass through said fibrous frames 2, 3 and said core 4, as shown in FIG. 1. Said stitching thread 5 consists of a roving comprising a plurality of filaments that are not linked together. After said stitching operation, the thread portions 8, 9 that pass through said fibrous frames 2, 3 and the core 4 have longitudinal channels in said core that are provided between said filaments and extend from one of said fibrous frames to the other; and c) said sandwich structure 1 is impregnated with a resin. Said impregnation operation is carried out such that said curable resin is made to penetrate said longitudinal channels of said thread through-portions 8, 9 in order to form, at the location of each of said portions, a resin bridge of which the opposed ends are in contact with the resin impregnating the flexible fibrous frames 2, 3.

It should be noted that:
the flexible core 4, which is shown as being plate-shaped, can, in reality, be of any shape having two opposed faces, for example a cylinder, a cone or a prism. Said core is made of a material which is capable of being penetrated by a needle, such as a polyurethane foam, a polypropylene or, preferably, a polystyrene. Moreover, this material is impervious to the resin used to impregnate the flexible fibrous frames 2 and 3; and each of the flexible fibrous frames 2 and 3 has a fibrous structure that can be produced in any known manner. Said frames 2 and 3 are each in the form of a layer of carbon fibres or of any other material that is capable of forming high-strength fibres. Moreover, said frames 2 and 3 can have different and varied thicknesses and shapes.

Figure 2:
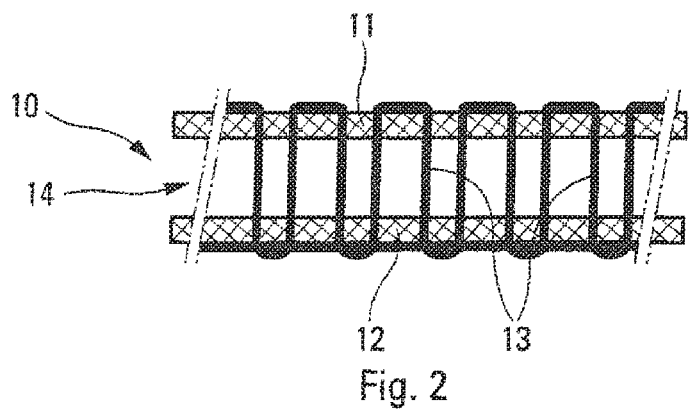
FIG. 2 is a schematic and partial view of a composite part produced from the preform from FIG. 1.

As is shown in FIG. 1, it is advantageous for the frames 2 and 3 to be parallel to one another and for the thread through-portions 8 and 9 to be orthogonal to said frames. In FIGS. 1 and 2, for the purpose of clarity, a large distance is shown between the two thread portions for each stitch; however, in reality, said thread portions can of course be very close to one another.

It should be noted that the sandwich structure 1 joined by the threads 5 and 6 is flexible and may possibly undergo changes of shape. Furthermore, at this stage of the method, the dimensions of the structure 1 are preferably checked.

Following stitching, the sandwich structure 1 is impregnated with the curable resin. Impregnation is preferably carried out under vacuum pressure such that said resin penetrates not only the fibrous frames 2 and 3, but also the longitudinal channels of the thread 5.

During this impregnation operation, the core 4 is not impregnated because it is impervious to the resin. The impregnated resin is then cured, for example by increasing the temperature, possibly in conjunction with applying pressure (of a few bars).

According to the invention, in order to form the C—C carbon matrix of the sandwich structure 1, said structure is pre-densified (aforementioned step B/) by gas-phase infiltration as indicated above, and this makes it possible to also remove the core 4.

The resulting structure is then subject to other operations indicated hereinafter, and is then densified in step C/ with the aim of producing a ceramic matrix.

The monolithic composite part 10 from FIG. 2 is ultimately produced and comprises two skins 11 and 12 of composite material (from the flexible frames 2 and 3) which are spaced apart from one another and interconnected by a plurality of thread-like spacers 13 which are made of composite material (from the through-thread portions 8 and 9) and are orthogonal to said skins 11 and 12. In a preferred application, the space 14 between the two skins 11 and 12 is intended to have a coolant flowing therethrough in particular so as to make the monolithic composite part 10 capable of withstanding high temperatures. The two skins 11 and 12 forming the space 14 are kept at a distance from one another by means of thread-like spacers 13 which, in an application of this type, provide the shape of the structure, ensure that the coolant is resistant to pressure and enhance convective heat transfer.

Moreover, in a preferred embodiment, non-destructive testing is performed, in an intermediate step between aforementioned steps B/ and C/, on the preform that was pre-densified in step B/.

Said pre-densified preform is then machined. It is possible to machine the pre-densified preform (C—C) using standard means, but this machining would be very difficult to perform on the final material (C—C/SiC) which becomes very hard following densification.

This intermediate step is preferably a step of low-thickness mechanical machining which is used to prepare the structure for liquid-phase densification and to give said structure its desired final geometry.

Moreover, in this intermediate step, threaded holes and/or bores are machined if the part 10 requires threaded holes and/or bores therein in order to install a coolant supply means on the part 10, for example. This machining operation can be carried out by means of ultrasound for example.

Figure 3:
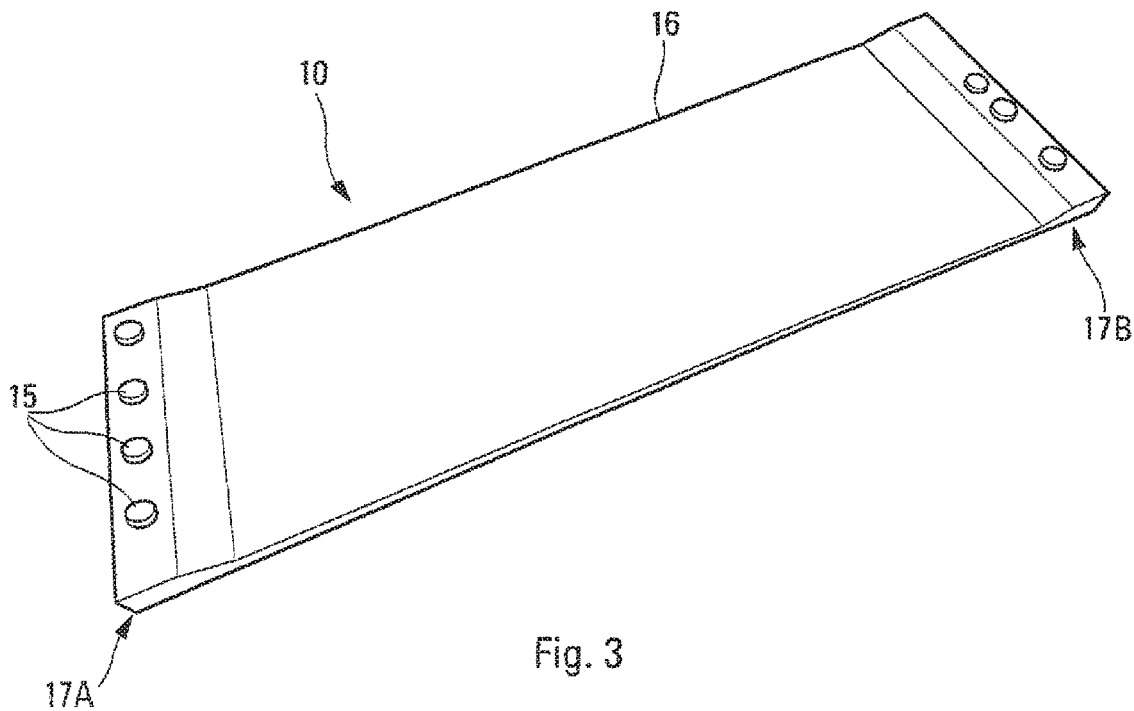
FIG. 3 is a perspective view of a monolithic part produced in panel form and provided with plugs for a liquid-phase infiltration step.

Plugs 15 are then arranged in said threaded holes and said bores, as shown for the part 10 from FIG. 3, which is produced as a plate 16 and in the shoulders of which threaded holes are provided. Said plugs 15 are used at least during the densification step, step C/, in order to prevent the threaded holes and bores from getting clogged (such that they are in the final part).

In a preferred embodiment, in step C/, in order to achieve liquid-phase densification, silicon is introduced in liquid paste form (slurry) and spreads out in the part under the effect of heat and pressure in a densification furnace by capillary action and by gas being transported on the walls that are not initially covered with paste. Siliconising can be achieved by a suitable form of heat treatment. In a preferred embodiment, the method described in WO2008/106932 is used to carry out this densification.

At this stage of the method, the dimensions of the part 10 are generally checked (using non-destructive testing).

It should be noted that the method according to the invention can be used to produce a part 10 having variable thickness, as shown by way of example by the edges 17A and 17B of the panel 16 from FIG. 3. In order to do this, a fibrous preform 1 is produced in step A/ that has a suitable shape and suitable dimensions and may be provided with stiffeners for example.

Furthermore, it is also possible to cover the outer face of at least one of said skins 11 or 12 of the part 10 with at least one coating, for example using a sealing material that is used as standard to create impermeability.

The invention claimed is:

1. A method for producing a thermostructural monolithic fibres/matrix composite part, comprising two skins of composite material which are spaced apart from one another and interconnected by a plurality of thread-like spacers of composite material, said method comprising at least:
    A/ producing a fibrous preform provided with a sandwich structure comprising an intermediate flexible core and two outer fibrous frames arranged on opposed outer faces of said flexible core and joined by thread portions that pass through said fibrous frames, said preform being impregnated with resin;
    B/ curing said preform and removing said core; and
    C/ densifying a resulting structure,
    wherein, in step B/, pre-densification is carried out by gas-phase infiltration so as to pre-densify said preform and thus said thread portions intended for forming said spacers, said gas-phase infiltration providing said thread portions with a layer that protects said thread portions during step C/, and said core being removed by the pre-densification by gas-phase infiltration,
    wherein, in step C/, said structure is densified by liquid-phase infiltration.

2. The method according to claim 1, wherein, in an intermediate step between steps B/ and C/, the preform that was pre-densified in step B/ is machined.

3. The method according to claim 1, wherein, in step C/, in order to achieve liquid-phase densification, silicon is introduced in liquid paste form and spreads out under heat and pressure in a densification furnace.

4. The method according to claim 1, wherein, in step A/, a fibrous preform having variable thickness is produced.

5. The method according to claim 1, wherein, in step A/:
a) said sandwich structure is a flexible sandwich structure that comprises said intermediate flexible core, which is made of a material that is capable of being penetrated by a needle and is impervious to the resin, and said two outer fibrous frames that are flexible fibrous frames arranged on and opposed outer faces of said flexible core;
b) said fibrous frames and said core of said sandwich structure are joined by stitching by means of a thread forming stitches that include said thread portions that pass through said fibrous frames and said core, said thread consisting of a roving comprising a plurality of filaments that are not linked together, said thread portions that pass through said fibrous frames and said core having, following said stitching operation, longitudinal channels in said core that are provided between said filaments and extend from one of said fibrous frames to the other; and
c) said sandwich structure is impregnated with said resin, said impregnation operation being carried out such that said resin is made to penetrate said longitudinal channels of said thread portions in order to form, at the location of each of said portions, a resin bridge, of which opposed ends are in contact with the resin impregnating said flexible fibrous frames.

6. The method according to claim 1, wherein said layer that protects said thread portions during step C/ is a carbon layer.

7. A method for producing a thermostructural monolithic fibres/matrix composite part, comprising two skins of composite material which are spaced apart from one another and interconnected by a plurality of thread-like spacers of composite material, said method comprising at least:

A/ producing a fibrous preform provided with a sandwich structure comprising an intermediate flexible core and two outer fibrous frames arranged on opposed outer faces of said flexible core and joined by thread portions that pass through said fibrous frames, said preform being impregnated with resin;

B/ curing said preform and removing said core; and

C/ densifying the resulting structure, wherein, in step C/, said structure is densified by liquid-phase infiltration, wherein, in step B/, pre-densification is carried out by gas-phase infiltration so as to pre-densify said preform and thus said thread portions intended for forming said spacers, wherein, in an intermediate step between steps B/ and C/, the preform that was pre-densified in step B/ is machined, and wherein, in said intermediate step, threaded holes and/or bores are machined.

8. The method according to claim 7, wherein, at least during the densification step, step C/, plugs are arranged in said threaded holes and/or said bores.

* * * * *